(12) United States Patent
Graziano, Jr. et al.

(10) Patent No.: US 11,920,528 B1
(45) Date of Patent: Mar. 5, 2024

(54) PREIGNITION MITIGATION STRATEGY FOR GASEOUS FUEL ENGINE

(71) Applicant: Caterpillar Inc., Peoria, IL (US)

(72) Inventors: Michael T. Graziano, Jr., Washington, IL (US); Eric L. Schroeder, Germantown Hills, IL (US); Christopher R. Gehrke, Chillicothe, IL (US); Jaswinder Singh, Dunlap, IL (US); Patrick J. Seiler, Peoria, IL (US); Andrew J. Neaville, Mt. Pulaski, IL (US); Geetika Dilawari, Dunlap, IL (US); Zachary S. Engstrom, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/198,408

(22) Filed: May 17, 2023

(51) Int. Cl.
*F02D 41/00* (2006.01)
*F02B 43/12* (2006.01)
*F02D 41/38* (2006.01)

(52) U.S. Cl.
CPC .......... *F02D 41/0027* (2013.01); *F02B 43/12* (2013.01); *F02D 41/38* (2013.01); *F02D 2041/389* (2013.01); *F02D 2200/024* (2013.01)

(58) Field of Classification Search
CPC ................ F02D 41/0027; F02D 41/38; F02D 2041/389; F02D 41/40; F02D 19/0607; F02D 19/0626; F02B 43/12
See application file for complete search history.

(56) References Cited

U.S. PATENT DOCUMENTS

| | | | |
|---|---|---|---|
| 6,557,528 B2 | 5/2003 | Hiltner et al. | |
| 9,228,503 B2 | 1/2016 | Haeming et al. | |
| 9,869,290 B2 * | 1/2018 | Schuele | F02D 35/023 |
| 2013/0311064 A1 * | 11/2013 | Suzuki | F02D 41/22 |
| | | | 701/103 |
| 2015/0252738 A1 * | 9/2015 | Sixel | F02D 41/0085 |
| | | | 123/445 |

FOREIGN PATENT DOCUMENTS

| | | |
|---|---|---|
| CN | 1800617 A | 7/2006 |
| CN | 108763681 B | 1/2022 |
| JP | 4119796 B2 | 7/2008 |

* cited by examiner

*Primary Examiner* — Syed O Hasan
(74) *Attorney, Agent, or Firm* — Brannon Sowers & Cracraft PC

(57) ABSTRACT

Operating a gaseous fuel engine system includes detecting preignition in one or more of a plurality of cylinders based on a monitored cylinder pressure during combustion of a gaseous fuel such as a gaseous hydrogen fuel. Operating a gaseous fuel engine system also includes reducing a fuel injection amount for the one or more of the plurality of cylinders to a derated fuel injection amount that is based on a timing of the detected preignition. Fuel injection amount may be reduced to a greater relative extent if detected preignition is early, and to a lesser relative extent if detected preignition is later, in an engine cycle. Related apparatus and control logic is also disclosed.

14 Claims, 5 Drawing Sheets

PREIGNITION MITIGATION STRATEGY FOR GASEOUS FUEL ENGINE

STATEMENT OF GOVERNMENT INTEREST

This invention was made with government support under contract DE-EE0009422 awarded by DOE. The Government has certain rights in this invention.

TECHNICAL FIELD

The present disclosure relates generally to mitigating abnormal combustion in a gaseous fuel engine, and more particularly to reducing a fuel injection amount to a derated amount based on a timing of detected preignition.

BACKGROUND

Internal combustion engines can have widely ranging operating characteristics based upon engine design, combustion strategy, and type of combustible fuel used. Precise control over the manner and timing of combustion in an engine cylinder has long been a goal for purposes of power output and power density, efficiency, and optimized emissions. In compression-ignition engines, commonly operated on a diesel fuel, a timing of a start of combustion in a cylinder is generally governed by a pressure and temperature in a cylinder. In a conventional strategy, pressure and temperature in a cylinder is typically intended to reach an autoignition threshold when a piston reaches a top-dead-center position. The combustion of the fuel and air drives a rapid pressure and temperature increase driving the piston back toward a bottom-dead-center position to rotate a crankshaft. Spark-ignited engines such as gasoline or natural gas engines are typically operated to compress fluids in a cylinder to a lesser degree, with the timing of combustion dependent upon a timing of energizing a sparkplug. Different types and grades of fuels, including ratios of different blended fuels, can require various modifications to engine hardware and operating strategies to achieve combustion at an optimum timing and in an optimum manner.

In recent years increased efforts at commercializing engine systems producing reduced amounts of certain emissions has resulted in a suite of new challenges. With respect to timing of a start of combustion it has been observed that certain fuel blends can be relatively more challenging to reliably and predictably ignite at a desired timing. In the case of spark-ignited engines burning gaseous hydrogen fuels, or certain blends containing gaseous hydrogen fuels, fuel in the cylinders has been observed to be especially susceptible to igniting before a desired timing. Pre-igniting of such fuels has been observed to occur when a piston is moving towards a top-dead-center position but has not yet reached a top-dead-center position in a cylinder. Preignition is generally undesirable as not only does it make operation of the engine less predictable and typically less efficient, but also because preignition can be associated with increased wear and tear on an engine and sometimes even catastrophic engine failure. Mitigating preignition and various other forms of abnormal combustion has been the subject of considerable research and development investments. One known strategy for detecting, and acting upon, abnormal combustion in an internal combustion engine is known from U.S. Pat. No. 6,557,528B2 to Hiltner et al.

SUMMARY

In one aspect, a method of operating a gaseous fuel engine system includes monitoring a cylinder pressure in each of a plurality of cylinders combusting a gaseous fuel in a gaseous fuel engine, and detecting preignition in one of the plurality of cylinders based on the monitored cylinder pressure. The method further includes reducing a fuel injection amount for the one of the plurality of cylinders to a derated fuel injection amount that is based on a timing of the detected preignition.

In another aspect, a fuel control system for a gaseous fuel engine system includes a fueling control unit structured to receive cylinder pressure signals from a plurality of in-cylinder pressure sensors in a gaseous fuel engine, and to detect preignition in one of a plurality of cylinders in the gaseous fuel engine based on one or more corresponding cylinder pressure signals. The fueling control unit is further structured to output a preignition mitigation fueling command for a fuel injector for the one of the plurality of cylinders to reduce a fuel injection amount to a derated fuel injection amount that is based on a timing of the detected preignition.

In still another aspect, a gaseous fuel engine system includes a gaseous fuel engine having an engine housing with a plurality of cylinders formed therein, and a fuel system including a fuel supply, and a plurality of fuel injectors coupled to the engine housing to inject a fuel for combustion in the plurality of cylinders. The fuel system further includes a fuel control system having a plurality of in-cylinder pressure sensors, and a fueling control unit in control communication with each of the plurality of fuel injectors. The fueling control unit is structured to receive cylinder pressure signals from the plurality of in-cylinder pressure sensors indicative of preignition in at least one of the plurality of cylinders, and to determine the preignition includes early preignition or standard preignition. The fueling control unit is further structured to reduce a fuel injection amount for the at least one of the plurality of cylinders to a derated fuel injection amount.

DETAILED DESCRIPTION

Figure 1:
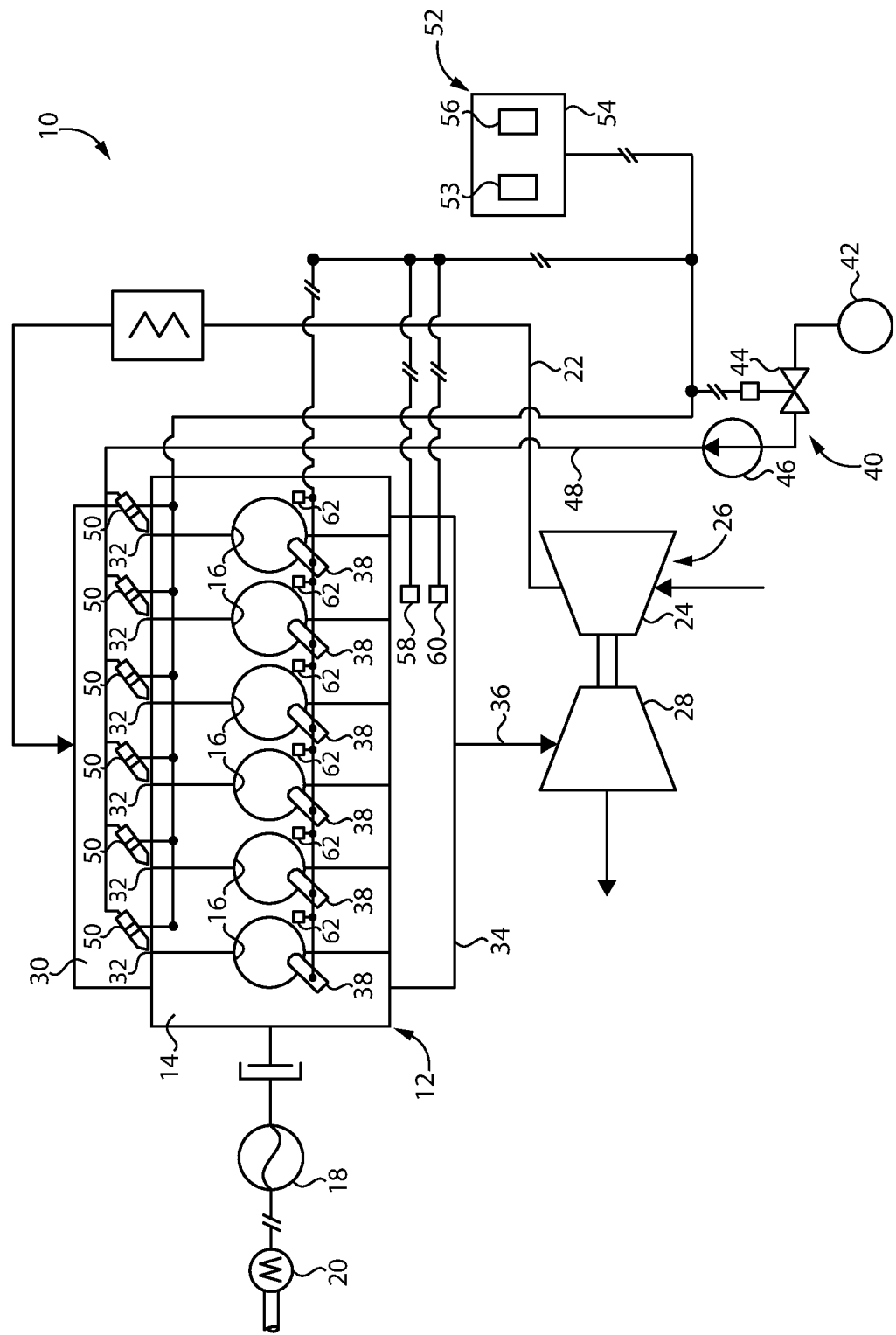
FIG. 1 is a diagrammatic view of a gaseous fuel engine system, according to one embodiment.

Referring to FIG. 1, there is shown a gaseous fuel internal combustion engine system 10, according to one embodiment. Engine system 10 includes a gaseous fuel engine 12 having an engine housing 14 with a plurality of combustion cylinders 16 formed therein. Although not specifically illustrated, it will be appreciated that a piston is positioned within each cylinder 16 and conventionally movable between a top-dead-center position and a bottom-dead-center position, typically in a four-stroke engine cycle. Engine system 10 may be operable to rotate a load 18, in the illustrated embodiment including an electrical generator electrically connected to an electric motor 20. In other embodiments engine system 10 could be configured for operating a mechanical driveline in a vehicle, a pump, a compressor, or an electrical generator for powering a local or regional electrical grid, to name a few examples. Cylinders 16 can include any number in any suitable arrangement such as an in-line pattern, a V-pattern, or still another.

Engine system 10 further includes an intake conduit 22 structured to convey a feed of intake air pressurized by way of a compressor 24 in a turbocharger 26 to an intake manifold 30 attached to engine housing 14. Pressurized intake air can be fed via intake manifold 30 to a plurality of intake ports 32 each extending to one of cylinders 16. An exhaust manifold 34 is also attached to engine housing 14 and conveys a flow of exhaust from engine 12 via an exhaust conduit 36 to a turbine 28 of turbocharger 26. Engine 12 may be spark-ignited and includes a plurality of sparkplugs 38 each extending into one of cylinders 16. Sparkplugs 38 can include prechamber sparkplugs in some embodiments although the present disclosure is not thereby limited.

As noted above, engine system 10 includes a gaseous fuel engine system. To this end, engine system 10 further includes a fuel system 40 having a fuel supply 42, a fuel admission valve 44, a fuel pressurization pump 46, a fuel conduit 48, and a plurality of fuel injectors 50. Fuel supply 42 may include a pressurized fuel supply containing a pressurized gaseous fuel. In other embodiments fuel supply 42 could contain a cryogenically stored liquified gaseous fuel such as liquid natural gas (LNG). Suitable gaseous fuels include gaseous hydrogen fuel, various blends of gaseous hydrogen fuel and gaseous hydrocarbon fuels such as methane, ethane, or natural gas, and potentially still others. A gaseous hydrogen fuel as contemplated herein may include gaseous molecular hydrogen. Engine system 10 could be coupled to a hydrogen reformer, to electrolysis equipment, or to a line gas supply of hydrogen or gaseous hydrocarbon in various embodiments.

In the illustrated example, fuel injectors 50 are configured as port injectors each structured to inject gaseous fuel for combustion in one of cylinders 16 into intake ports 32. In other embodiments fuel injectors 50 could include direct fuel injectors each extending into a corresponding one of cylinders 16, for example. Fuel injectors 50 may be electrically actuated and are each electrically connected to an electronic control unit 54 which is typically also electrically connected to sparkplugs 38.

Electronic control unit or fueling control unit 54 may be part of a fuel control system 52 of fuel system 40 including a processor 53 and a computer readable memory 56. Processor 53 can include any suitable device having a central processing unit (CPU) such as a microprocessor or a microcontroller. Computer readable memory can include any suitable computer readable memory such as RAM, ROM, FLASH, a hard drive, or still others and stores computer executable control instructions for execution by processor 53 as well as various maps and/or other data structures. Execution of computer executable instructions stored on memory 56 by processor 53 causes engine system 10 to perform functions of the present disclosure. The present disclosure is not limited with regard to hardware type, number or arrangement of processors or memories, or other architecture of control system 52.

Control system 52 may also include an engine speed sensor 58 and an engine load sensor 60. As engine load cannot be sensed directly, engine load sensor 60 might include a sensor operable to monitor a parameter having a known or determinable relationship to engine load, potentially in combination with other operating parameters of engine system 10. Engine load sensor 60 might be a so-called virtual load sensor in some embodiments. Control system 52 also includes a plurality of in-cylinder pressure sensors 62 resident on or in engine housing 14 and structured to monitor cylinder pressure in each respective one of cylinders 16 in real time, the significance of which will be further apparent from the following description.

As noted above, engine system 10 includes a gaseous fuel engine system structured to operate on a gaseous fuel including potentially pure gaseous molecular hydrogen or various blends containing gaseous molecular hydrogen at least in part, and potentially predominantly. In most instances it is desirable to ignite a gaseous fuel in a cylinder at or close to an engine timing where a piston in a given cylinder is at a top-dead-center position (a zero degree crank angle timing). Ignition timing is desirably governed by a timing of producing an electrical spark via a sparkplug in the cylinder. The ignitability properties of certain gaseous fuels can, however, sometimes result in ignition prior to the subject piston reaching a top-dead-center position. So-called preignition of a gaseous fuel can detract from engine performance expectations resulting in reduced efficiency and/or other problems. In some cases, preignition can cause serious engine performance degradation and wear and tear on components, even leading to catastrophic engine damage in some instances if not mitigated. Preignition as contemplated herein includes initiation or hastening of combustion that occurs prior to or during a compression stroke of a piston. Preignition may be observed early in an engine cycle, including at or prior to a bottom-dead-center piston position just before a piston commences a compression stroke, as well as later in an engine cycle. For instance, "early" preignition as discussed further herein might be observed at about 275 degrees before a top-dead-center position. "Standard" preignition as further discussed herein might be observed at about 60 degrees before a top-dead-center position. Various engine platforms and operating strategies can differ with regard to what is, or is not, considered preignition, but in all cases preignition includes initiation or undesired hastening of combustion of fuel and air that occurs prior to spark production.

The present disclosure proposes unique solutions to address certain challenges associated with preignition by way of detection, mitigation, and recovery from preignition. Whereas conventional practice in gaseous fuel engine platforms has often been to derate the engine, reducing fueling amounts and thus power output of all cylinders, the present disclosure contemplates preignition detection and mitigation cylinder-by-cylinder. As further discussed herein, the present disclosure also offers various strategies for collecting information as to preignition cylinder-by-cylinder and reporting the same to enable various engine or fueling diagnostics and investigations as well as scheduling of service.

Electronic control unit or fueling control unit 54 may be structured to receive cylinder pressure signals from the plurality of in-cylinder pressure sensors 62 in gaseous fuel engine 12, and to detect preignition in one or more of the plurality of cylinders 16 in gaseous fuel engine 12 based on one or more corresponding cylinder pressure signals associated with the subject cylinders 16. Fueling control unit 54 may further be structured to output a preignition mitigation fueling command for a fuel injector 50 for the one of the plurality of cylinders 16 for which preignition is detected to reduce a fuel injection amount to a derated fuel injection amount that is based on a timing of the detected preignition. A preignition mitigation fueling command might include an electrical current command to an electrical actuator in a fuel injector, varied as compared to an electrical current command in a prior engine cycle so as to inject a reduced amount of fuel. Alternatively, a preignition mitigation fueling command could include a control command sent from a supervisory control unit to a dedicated fueling control unit that actually outputs an electrical current command to a fuel injector.

As suggested above certain types of preignition can be associated with more severe consequences than others if unmitigated. The present disclosure reflects the discovery that early preignition as opposed to standard preignition is beneficially addressed differently. Put differently, where preignition is detected relatively earlier in an engine cycle, for example, a crank angle timing several hundred degrees before a top-dead-center crank angle timing the consequences to an engine can be more severe than preignition detected at a relatively later crank angle timing closer to a top-dead center crank angle timing.

In some embodiments, fueling control unit 54 may be further structured to trigger an early preignition mitigation path if the detected preignition includes early preignition occurring at an earlier crank angle timing in an engine cycle, and to trigger a standard preignition mitigation path if the detected preignition includes standard preignition occurring at a later crank angle timing in the engine cycle. The early preignition mitigation path may include a relatively greater reduction to fuel injection amount. The standard preignition mitigation path may include a relatively lesser reduction to fuel injection amount. As also further discussed herein, fueling control unit 54 may be further structured to output a preignition recovery fueling command to increase the fuel injection amount after clearing a preignition condition. Detection of the preignition may be based on at least one of a magnitude, a timing, or a history, of cylinder pressure for the one or more of the plurality of cylinders for which preignition is detected. In this way, by detecting preignition, and determining that a detected preignition includes early preignition or standard preignition, fueling control unit 54 can respond optimally. These principles will be further apparent by way of the following descriptions of control logic and example implementations.

Figure 2:
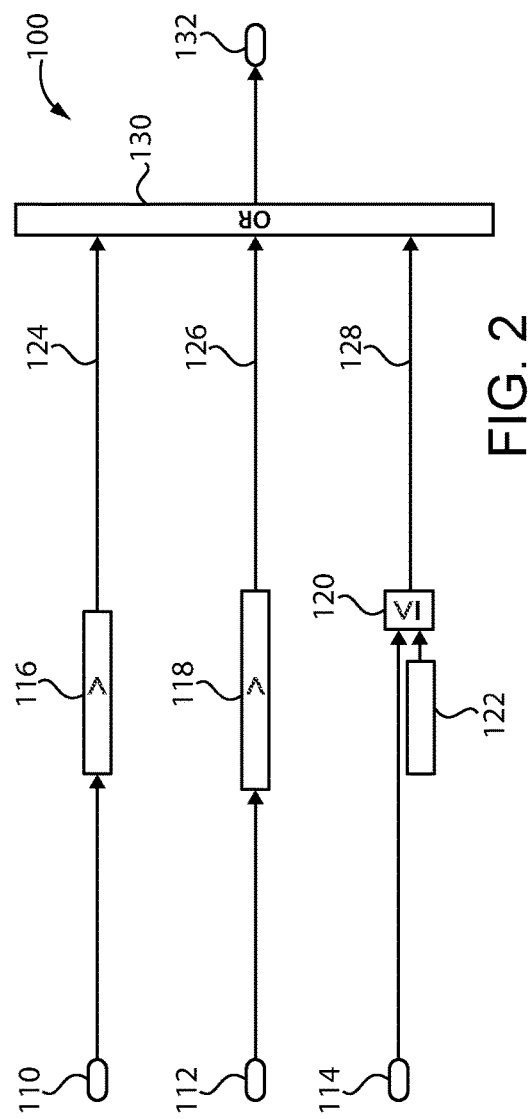
FIG. 2 is a control diagram for detecting preignition, according to one embodiment.

Referring also now to FIG. 2, there is shown a logic diagram 100 illustrating example input and calculations that might be performed by fueling control unit 54 in detecting standard preignition. It should be appreciated that the term "standard" is used herein to differentiate from early in connection to types of preignition and does not necessarily reflect an expected frequency of occurrence or manner of preignition. Numeral 110 shows a peak cylinder pressure value. At a block 116, the peak cylinder pressure value is compared to a peak cylinder pressure threshold. If the peak cylinder pressure value 110 exceeds the threshold a peak cylinder pressure condition signal 124 is produced. Numeral 112 shows a pressure at a crank angle value. The pressure at a crank angle value is compared to a pressure at a crank angle value threshold at a block 118. If the pressure at a crank angle value 112 exceeds the threshold, a pressure angle condition signal is produced at 126. Numeral 114 shows a fuel burn at crank angle input. A block 122 represents a crank angle fuel burn threshold. At a block 120 it is determined if the fuel burn at crank angle input 114 is less than or equal to the threshold. If less than or equal than the threshold, a fuel burn at crank angle fuel condition signal is produced at 128.

Numerals 110, 116, and 124 can be understood as a determination if a peak cylinder pressure in an engine cycle is too high then preignition has likely occurred. Numerals 112, 118, 126 can be understood as a determination that a higher cylinder pressure is observed at a given crank angle than what is otherwise expected, again indicating preignition has likely occurred. Numerals 114, 120, 122, 128, can be understood as a determination that more fuel has been burned than expected at a certain timing. An OR calculation is performed at a block 130. If any of 124, 126, 128 is true, then a preignition condition exists and a flag 132 is set. It will be appreciated logic diagram 100 represents cylinder pressure monitoring of any of a magnitude, a timing, or a history, that directly or indirectly is indicative of preignition.

Figure 3:
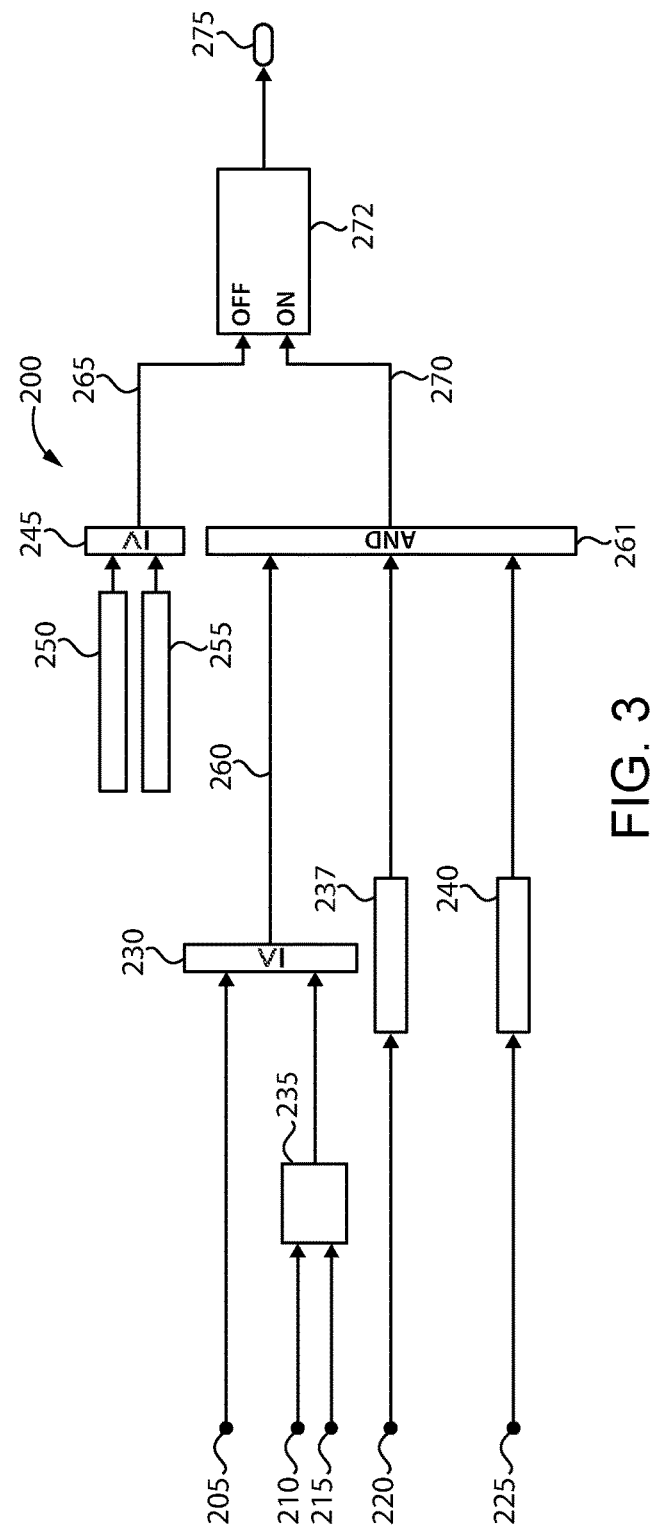
FIG. 3 is a control diagram for detecting preignition, according to one embodiment.

Focusing now on FIG. 3, there is shown a diagram 200 illustrating example detection of early preignition. Numeral 205 represents an indicated mean effective pressure (IMEP) calculation input for a cylinder. Numeral 210 shows an engine speed value input, and numeral 215 shows an engine load value input. A block 230 includes a determination whether the IMEP is less than or equal to an expected IMEP for engine speed and load as derived from a map 235. If the IMEP value 210 is less than or equal to expected IMEP then it is likely fuel has burned early and early preignition has occurred, reflected in an early preignition signal 260. Reference numeral 220 and reference numeral 225 represent sensor status inputs. Reference numerals 237 and 240 represent status OK determinations. At a block 261 an AND calculation determines if each of 260, 237, and 240 is true. If all are true an early preignition ON trigger 270 is produced. Numerals 205, 210, 230, 235 and 260 can be understood as determining early preignition has occurred based on a calculated IMEP.

Numeral 250 shows an early preignition counter input for example a counted number of preignition cycles divided by a divisor term. Numeral 255 shows an early preignition recovery cycle threshold. A block 245 determines whether the counter input is greater than or equal to the recovery cycle threshold, and if so produces a latch OFF trigger 265. Numerals 245, 250, 255 can be understood to determine if the subject cylinder has operated derated for a desired minimum time duration or desired number of engine cycles. At a block 272 an early preignition flag 275 is latched ON or OFF depending on whether the OFF trigger or the ON trigger occurs.

Figure 4:
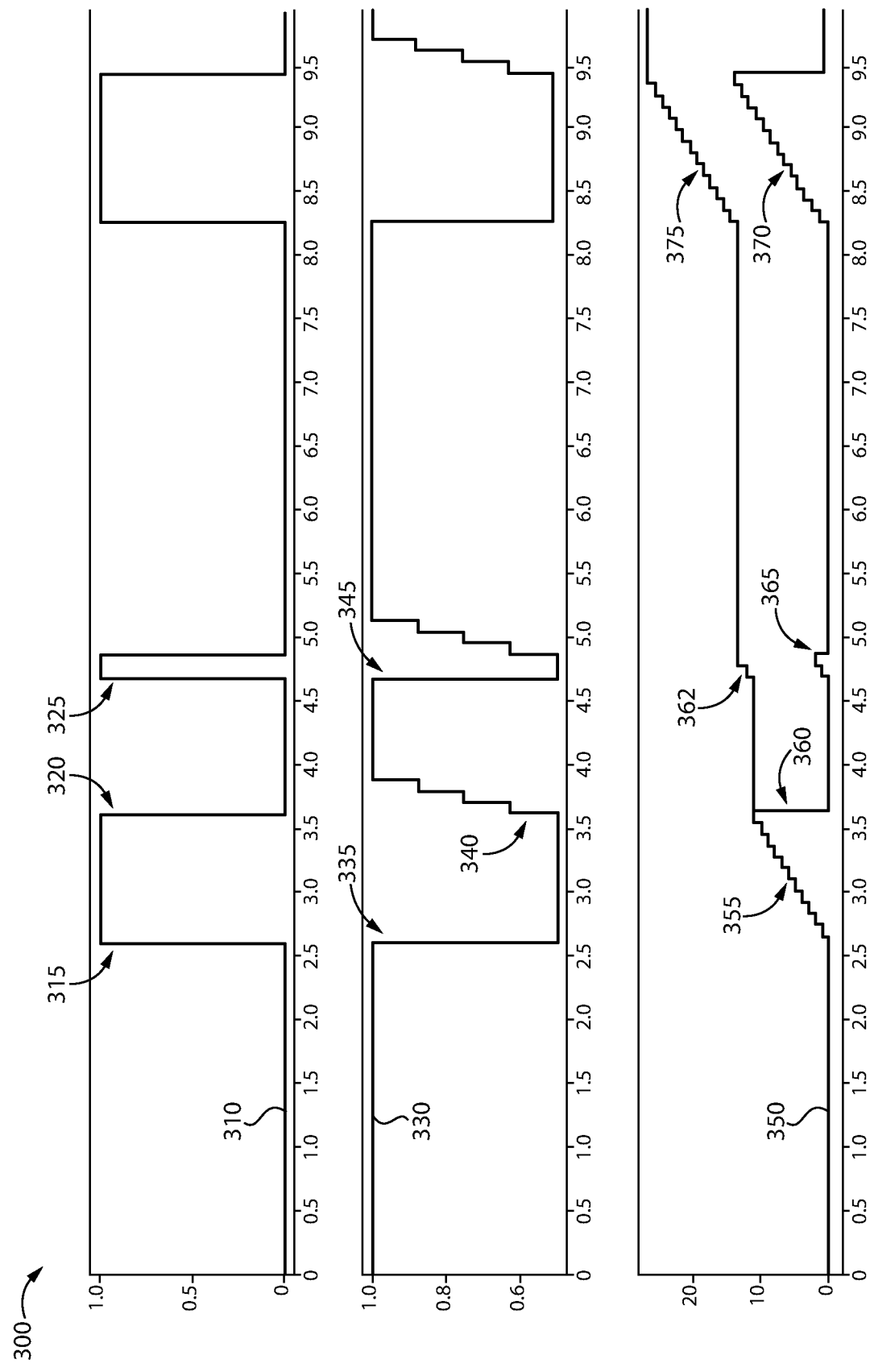
FIG. 4 is a graph of preignition detection, mitigation, and cycle counting, according to one embodiment.

Focusing now on FIG. 4, there is shown a graph 300 showing example operations in preignition detection, mitigation, and recovery. Numeral 310 shows a preignition flag or preignition condition. At 315 preignition is detected and the preignition flag goes high. At 320 preignition is removed and the flag goes low. At 325 preignition is detected again and the flag goes high again. Numeral 330 shows fueling or a fuel injection amount. At 335 fuel injection amount is reduced, for example a 25% reduction coinciding with detection of preignition. At 340 fuel begins to be brought back on incrementally. Thus, 335 shows reducing the fuel injection amount to a derated fuel injection amount, and 340 shows incrementally increasing the fuel injection amount from the derated fuel injection amount after clearing a preignition condition. Graph 300 is illustrated in the context of engine cycle number, not necessarily time. It will thus be appreciated that the engine operates at a derated fuel injection amount for a plurality of engine cycles providing an opportunity for the engine to recover. Reducing the fuel injection amount at 335 can be understood to be caused in response to outputting a preignition mitigation fueling command. Beginning to incrementally increase the fuel injection amount from the derated fuel injection amount at 340 can be understood as occurring in response to a preignition mitigation recovery command. Bringing fuel back on at 340 to recover from preignition can occur over the course of a plurality of engine cycles, for example increasing a fuel injection amount by about 5% in each increment until fuel injection amount is restored to a rated fuel injection amount or other threshold. At 345, fuel injection amount is again reduced in response to the detection of preignition at 325, and subsequently incrementally increased.

FIG. 4 also illustrates features of fueling control unit 54 relating to counting and reporting preignition events. Numeral 350 shows a preignition engine cycle counter. It can be seen that preignition engine cycles are counted at 355 while the preignition flag is set high between 315 and 320. When the preignition condition clears the sequential counter resets at 360. Preignition cycles are again counted at 365, and again at 370 corresponding to preignition again occurring.

Fueling control unit 54 may also be structured to count a global number of preignition engine cycles. Numeral 362 shows counting of preignition engine cycles in addition to those counted at 355, and again at 375. FIG. 4 thus shows counting sequential preignition cycles as well as counting global preignition cycles, on a cylinder-by-cylinder basis. Each time preignition is cleared the sequential counter resets. The global counter, however, continues to count preignition cycles over the course of a service life of the engine or between service intervals. Those skilled in the art will appreciate that performing a global count of preignition cycles can enable an owner or operator to identify individual cylinders that appear to experience preignition more than others and take corrective action as needed. Electronic control unit 54 may be structured to store the global counts of preignition events for each cylinder in memory 56. Sequential counts of preignition events could also be stored in memory 56 for various onboard diagnostic and corrective purposes.

Figure 5:
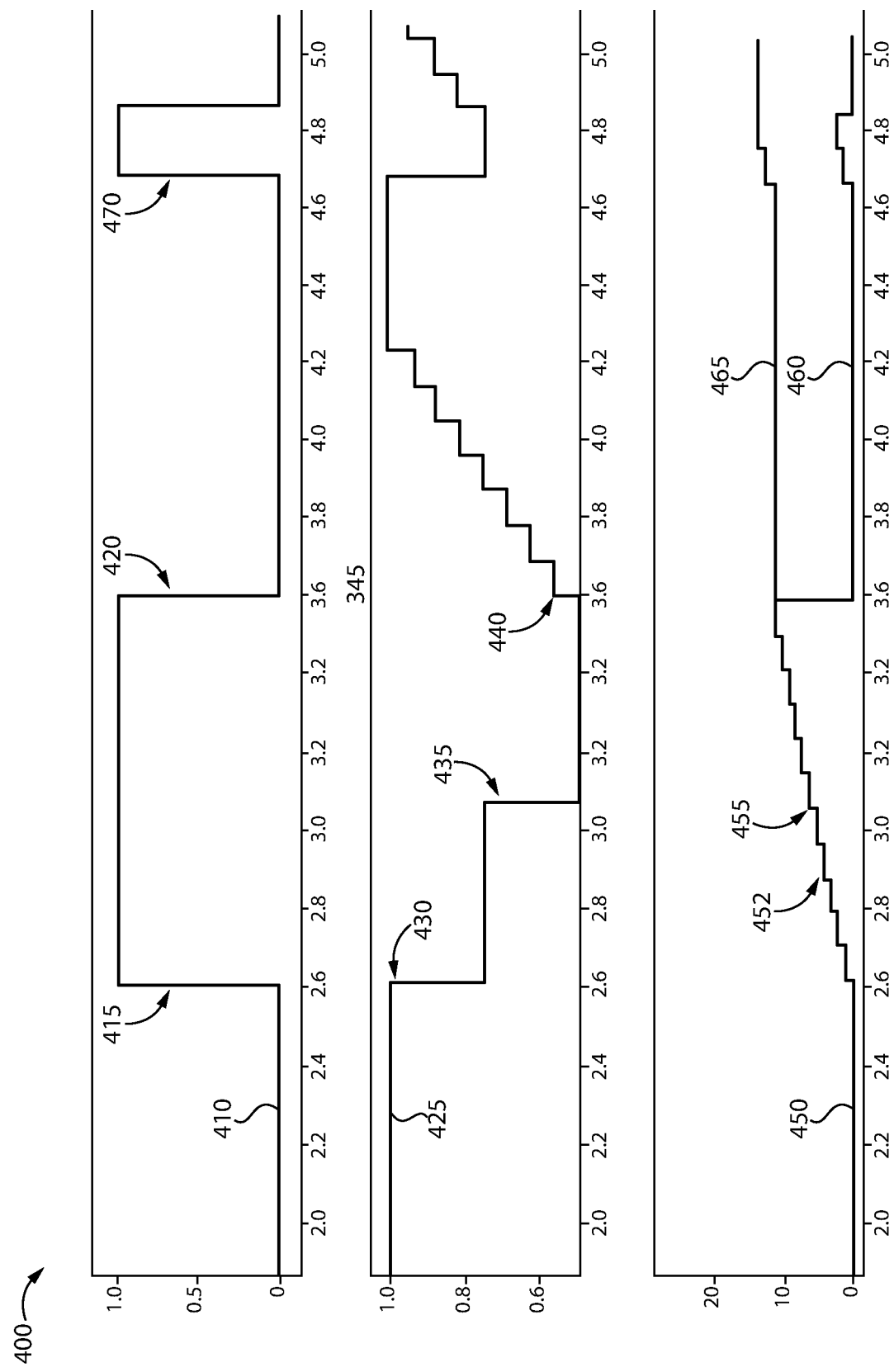
FIG. 5 is a graph of preignition detection, mitigation, and cycle counting, according to one embodiment.

Focusing now on FIG. 5, there is shown a graph 400 illustrating what might happen in an example application where a sequential preignition cycle counter exceeds a predefined threshold. Numeral 410 shows a preignition flag, with preignition detected at 415 and preignition cleared at 420. Preignition is again detected at 470. Numeral 425 shows a commanded fuel injection amount. A first reduction in fuel injection amount occurs at 430. At 435 the fuel injection amount is reduced further, such as where a preignition condition persists past a predefined number of preignition engine cycles. The initial reduction to fuel injection amount might be, for example, a 25% reduction, with the further reduction in fuel injection amount being more than a 25% reduction, such as a 50% reduction, a 75% reduction, etc. At 440 the commanded fuel injection amount is incrementally restored and the cylinder given an opportunity to recover. Numeral 450 shows a cycle counter. Preignition engine cycles are counted at 452. At 455 the predefined number of sequential preignition engine cycles is exceeded, and the further reduction to fuel injection amount performed as shown at 435. The sequential counter is reset when the preignition condition has cleared, as shown at 460. Numeral 465 shows continuing counting preignition engine cycles via the global cycle counter.

Figure 6:
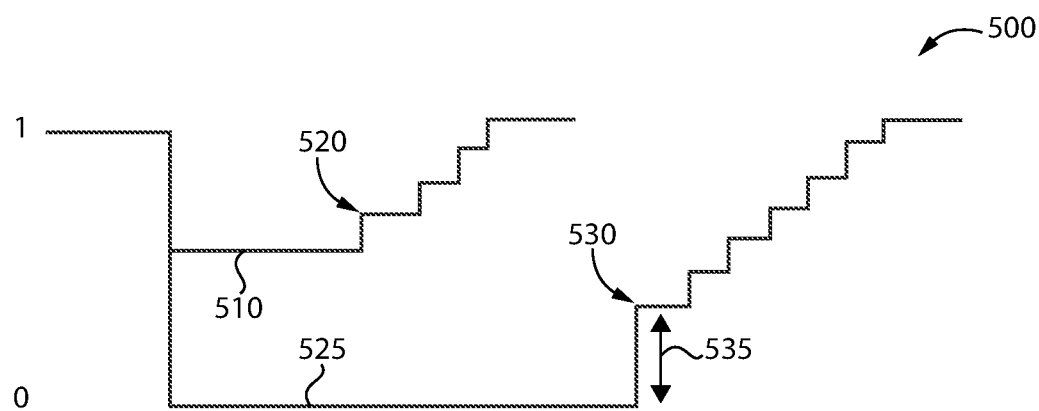
FIG. 6 is a graph comparing early preignition versus standard preignition detection and mitigation, according to one embodiment.

Referring now to FIG. 6, there is shown yet another graph 500 illustrating what might be observed mitigating standard preignition at 510 in comparison to early preignition at 525. In graph 500 it can be seen that a relative fuel reduction amount in response to standard preignition 510 is relatively less than that for early preignition 525. This is because in the case of early preignition, the reduction to fuel amount can include a reduction to zero, commanding shutting off fuel injection entirely. In the case of mitigating early preignition fuel is incrementally restored as shown at 530. Numeral 535 shows a misfire limit such that a first increment of increased fuel injection amount when recovering from early preignition is skipped over by increasing the fuel injection amount in a first increment above misfire limit 535.

INDUSTRIAL APPLICABILITY

Figure 7:
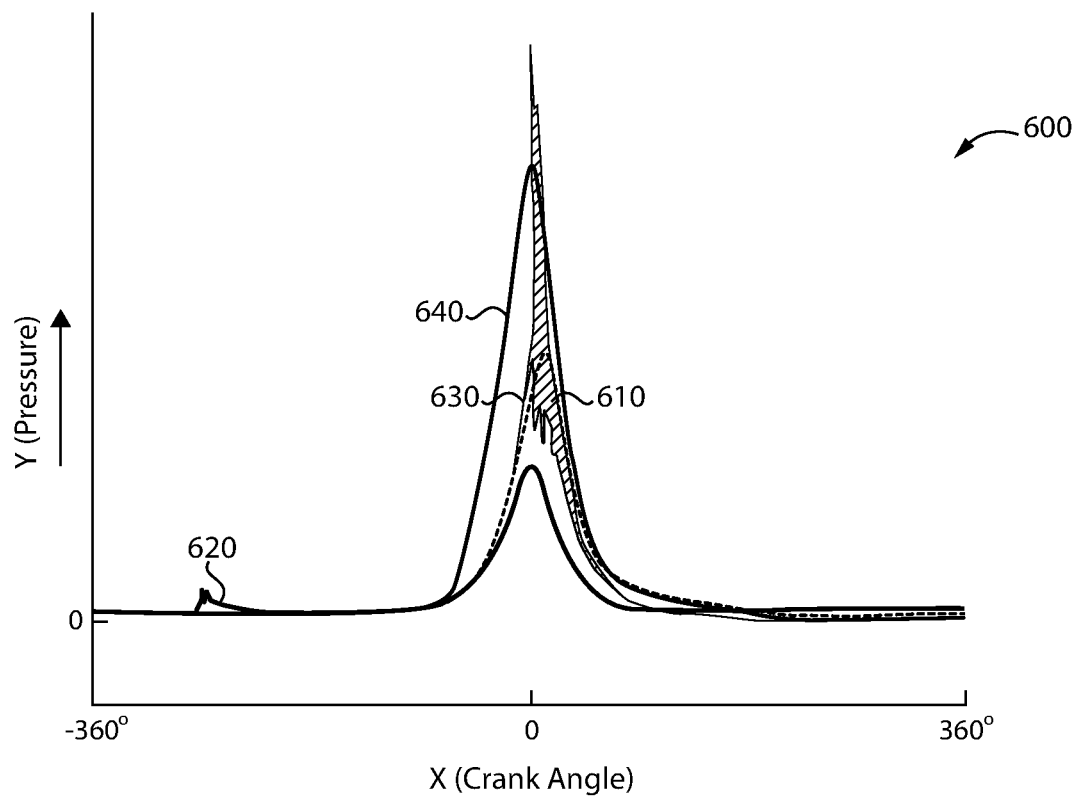
FIG. 7 is a graph of cylinder pressure traces showing early preignition, standard preignition, and desired operation.

Still referring to the drawings generally, but focusing now on FIG. 7, there is shown another graph 600 illustrating cylinder pressures that might be observed in different scenarios. In graph 600 crank angle is shown on the X-axis, and cylinder pressure shown on the Y-axis. Trace 610 shows what might be expected in normal engine operation, with cylinder pressure peaking just shortly after a zero degree crank angle or top-dead-center position. Numeral 620 shows a trace that might be observed for early preignition, such as where preignition occurs during an intake stroke of the associated piston. It will be noted that cylinder pressure in trace 620 shows a lower cylinder pressure at or around the zero degree crank angle timing than in the normal trace 610. This is the case because fuel has burned already and is contributing less, if at all, to cylinder pressure rise around top-dead center. In this way, early preignition can produce a cylinder pressure history that is similar to a dead cylinder or a cylinder not firing at all. It will be recalled the present disclosure may detect early preignition by calculating IMEP from a stored cylinder pressure history. Thus, a lower IMEP could be expected in the case of early preignition as compared to what would be expected for normal operation.

Trace 620 shows what might be observed where preignition occurs approximately during a compression stroke approximately midway between the bottom-dead-center position and the top-dead-center position, in other words a standard preignition. Numeral 630 shows knock that can often be associated with preignition. It can also be noted the pressure rise in trace 640 begins earlier than in the normal combustion case or the early preignition case 620. The peak cylinder pressure shown via trace 640 also exceeds the peak cylinder pressure seen with normal combustion 610.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a gaseous fuel engine system comprising: monitoring a cylinder pressure in each of a plurality of cylinders combusting a gaseous fuel in a gaseous fuel engine; detecting preignition in one of the plurality of cylinders based on the monitored cylinder pressure; reducing a fuel injection amount for the one of the plurality of cylinders to a derated fuel injection amount that is based on a timing of the detected preignition, wherein the gaseous fuel includes a gaseous hydrogen fuel, wherein the detecting preignition includes detecting the preignition based on at least one of a magnitude, a timing, or a history, of the monitored cylinder pressure, and further comprising calculating a mean effective pressure (IMEP) of the cylinder based on the history of the monitored cylinder pressure, and wherein the detecting preignition includes detecting preignition based on the calculated IMEP.

2. The method of claim 1 wherein the reducing the fuel injection amount includes reducing the fuel injection amount to a greater relative extent if the detected preignition occurs at an earlier crank angle timing in an engine cycle, and reducing the fuel injection amount to a lesser relative extent if the detected preignition occurs at a later crank angle timing in the engine cycle.

3. The method of claim 2 wherein the reducing the fuel injection amount to a greater relative extent includes shutting off fuel injection to the one of the plurality of cylinders.

4. The method of claim 1 further comprising incrementally increasing the fuel injection amount from the derated fuel injection amount in a plurality of engine cycles after clearing a preignition condition.

5. The method of claim 4 wherein the incrementally increasing the fuel injection amount includes increasing the fuel injection amount above a misfire limit of the engine in a first increment.

6. The method of claim 1 further comprising counting preignition engine cycles for the one of the plurality of cylinders.

7. The method of claim 6 further comprising reducing the fuel injection amount further if a preignition condition persists past a predefined number of preignition engine cycles.

8. The method of claim 7 wherein the counting preignition engine cycles includes counting a number of sequential preignition engine cycles.

9. A fuel control system for a gaseous fuel engine system comprising: a fueling control unit structured to: receive cylinder pressure signals from a plurality of in-cylinder pressure sensors in a gaseous fuel engine; detect preignition in one of a plurality of cylinders in the gaseous fuel engine based on one or more corresponding cylinder pressure signals; output a preignition mitigation fueling command for a fuel injector for the one of the plurality of cylinders to reduce a fuel injection amount for the one of the plurality of cylinders to a derated fuel injection amount that is based on a timing of the detected preignition, wherein the gaseous fuel includes a gaseous hydrogen fuel, wherein the fueling control unit is further structured to detect the preignition based on at least one of a magnitude, a timing, or a history, of cylinder pressure for the one of the plurality of cylinders, and wherein the fueling control unit is further structured to calculate a mean effective pressure (IMEP) of the one of the plurality of cylinders based on the history of cylinder pressure, and to detect the preignition based on the calculated IMEP.

10. The fuel control system of claim 9 wherein the fueling control unit is further structured to trigger an early preignition mitigation path if the detected preignition includes early preignition occurring at an earlier crank angle timing in an engine cycle, and to trigger a standard preignition mitigation path if the detected preignition includes standard preignition occurring at a later crank angle timing in the engine cycle.

11. The fuel control system of claim 10 wherein:
the early preignition mitigation path includes a reduction to fuel injection amount to a greater relative extent, and the standard preignition mitigation path includes a reduction to fuel injection amount to a lesser relative extent; and
the fueling control unit is further structured to output a preignition recovery fueling command to increase the fuel injection amount after clearing a preignition condition.

12. The fuel control system of claim 9 wherein the fueling control unit is further structured to:
count preignition engine cycles for the one of the plurality of cylinders; and
output another preignition mitigation fueling command to reduce the fuel injection amount further if a preignition condition persists past a predefined number of preignition engine cycles.

13. A gaseous fuel engine system comprising: a gaseous fuel engine including an engine housing having a plurality of cylinders formed therein; a fuel system including a fuel supply, and a plurality of fuel injectors coupled to the engine housing to inject a fuel for combustion in the plurality of cylinders, and a fuel control system; the fuel control system including a plurality of in-cylinder pressure sensors, and a fueling control unit in control communication with each of the plurality of fuel injectors, the fueling control unit structured to: receive cylinder pressure signals from the plurality of in-cylinder pressure sensors indicative of preignition in at least one of the plurality of cylinders; determine the preignition includes early preignition or standard preignition; reduce a fuel injection amount for the at least one of the plurality of cylinders to a derated fuel injection amount, wherein the gaseous fuel includes a gaseous hydrogen fuel, wherein the fueling control unit is further structured to store a cylinder pressure history, and to determine the preignition includes early preignition based on the stored cylinder pressure history.

14. The engine system of claim 13 wherein the fueling control unit is further structured to count preignition cycles for the at least one of the plurality of cylinders, and to reduce the fuel injection amount further if a number of the counted preignition cycles exceeds a predetermined threshold.

* * * * *